I

United States Patent [19]
Ward

[11] Patent Number: 5,897,040
[45] Date of Patent: Apr. 27, 1999

[54] CELLULAR TELEPHONE MOTORCYCLE MOUNTING APPARATUS

[76] Inventor: Rod R. Ward, Rte. 3, Box 7A, Halls, Tenn. 38040

[21] Appl. No.: 09/063,959

[22] Filed: Apr. 21, 1998

[51] Int. Cl.$^6$ ............................... B62J 11/00; H04M 1/00
[52] U.S. Cl. .......................... 224/413; 224/183; 224/419; 224/440; 224/463; 379/446
[58] Field of Search ...................................... 224/413, 419, 224/430, 431, 432, 428, 436, 437, 439, 440, 463, 484, 555, 562, 183, 32 R; 248/683, 309.4; 379/446, 449, 440, 433, 447

[56] References Cited

U.S. PATENT DOCUMENTS

| | | | |
|---|---|---|---|
| D. 317,452 | 6/1991 | Garab | D14/250 |
| 4,303,184 | 12/1981 | Kloth | 224/447 |
| 4,469,256 | 9/1984 | McEwen | 224/413 |
| 4,677,654 | 6/1987 | Lagin et al. | 455/550 |
| 4,750,658 | 6/1988 | Jennings | 224/275 |
| 5,001,779 | 3/1991 | Eggert et al. | 455/436 |
| 5,664,716 | 9/1997 | Nuckolls | 224/430 |

Primary Examiner—Allan N. Shoap
Assistant Examiner—Maerena Brevard
Attorney, Agent, or Firm—Douglas E. Mackenzie

[57] ABSTRACT

A cellular telephone motorcycle mounting apparatus is provided for mounting a cellular telephone to a motorcycle gas tank is disclosed. The inventive device includes a front portion, a back portion, a pair of lateral portion, a top portion and a bottom portion forming a rectangular enclosure, the rectangular enclosure being designed for receiving a cellular phone, the bottom portion having a transverse slit separating a bottom portion top section and a bottom portion bottom section, and the lateral portions having opposing slits extending along a length thereof, the opposing slits being aligned and joined with the transverse slit, the opposing slits and transverse slit defining an opening in the rectangular enclosure, a pair of opposing handle portions, each handle portion being disposed along a back portion longitudinal edge, an aperture formed in the top portion, the aperture being designed for receiving a cellular phone antenna, a plurality of magnets fixedly attached to a back portion outside surface for attachment to a motorcycle gas tank and a pair of zippers for releasably closing the opening in the rectangular enclosure.

7 Claims, 2 Drawing Sheets

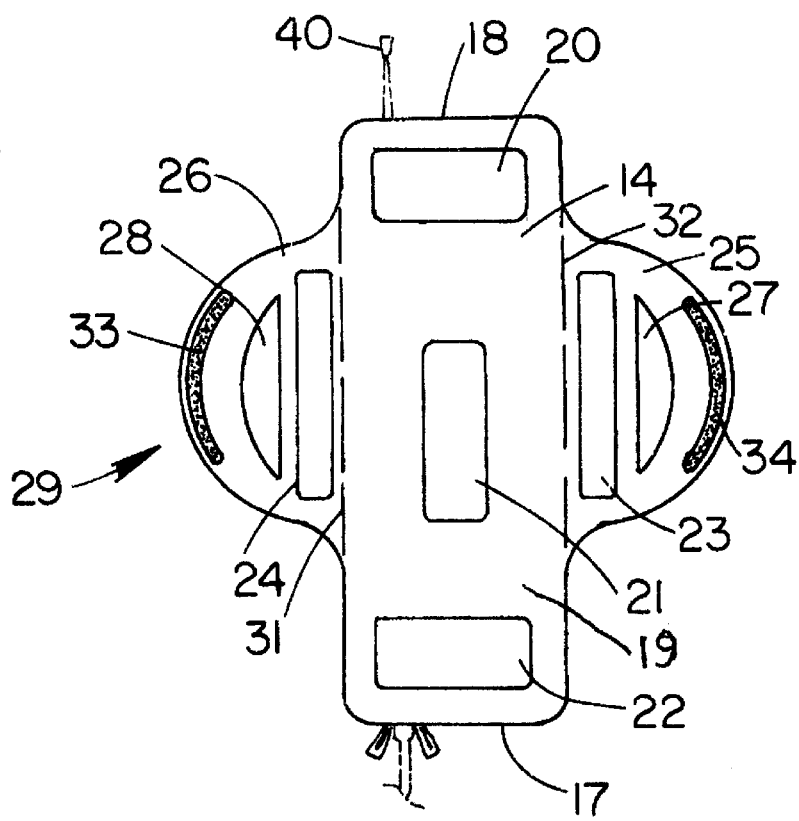
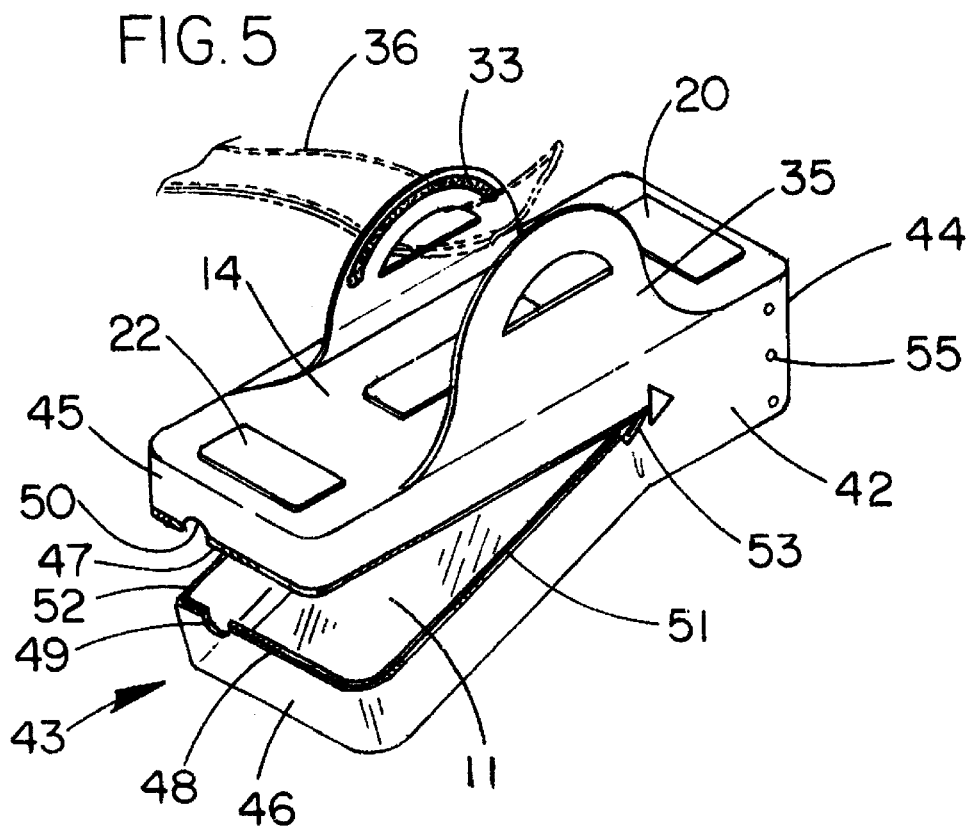

CELLULAR TELEPHONE MOTORCYCLE MOUNTING APPARATUS

BACKGROUND OF THE INVENTION

1. Field of the Invention

The present invention relates to cases for cellular telephones and more particularly pertains to a new cellular telephone motorcycle mounting apparatus for mounting a cellular telephone to a motorcycle gas tank.

2. Description of the Prior Art

The use of cases for cellular telephones is known in the prior art. More specifically, cases for cellular telephones heretofore devised and utilized are known to consist basically of familiar, expected and obvious structural configurations, notwithstanding the myriad of designs encompassed by the crowded prior art which have been developed for the fulfillment of countless objectives and requirements.

Known prior art cases for cellular telephones include U.S. Pat. No. 4,677,654; U.S. Patent Des. 317,452; and U.S. Patent 352,031. Means for mounting sound systems and the like to motorcycles are disclosed in U.S. Pat. No. 4,750,658; U.S. Pat. No. 4,303,184; and U.S. Pat. No. 5,001,779.

While these devices fulfill their respective, particular objectives and requirements, the aforementioned patents do not disclose a new cellular telephone motorcycle mounting apparatus. The inventive device includes a front portion, a back portion, a pair of lateral portion, a top portion and a bottom portion forming a rectangular enclosure, the rectangular enclosure being designed for receiving a cellular phone, the bottom portion having a transverse slit separating a bottom portion top section and a bottom portion bottom section, and the lateral portions having opposing slits extending along a length thereof, the opposing slits being aligned and joined with the transverse slit, the opposing slits and transverse slit defining an opening in the rectangular enclosure, a pair of opposing handle portions, each handle portion being disposed along a back portion longitudinal edge, an aperture formed in the top portion, the aperture being designed for receiving a cellular phone antenna, a plurality of magnets fixedly attached to a back portion outside surface for attachment to a motorcycle gas tank and a means for releasably closing the opening in the rectangular enclosure.

In these respects, the cellular telephone motorcycle mounting apparatus according to the present invention substantially departs from the conventional concepts and designs of the prior art, and in so doing provides an apparatus primarily developed for the purpose of mounting a cellular telephone to a motorcycle gas tank.

SUMMARY OF THE INVENTION

In view of the foregoing disadvantages inherent in the known types of cases for cellular telephones now present in the prior art, the present invention provides a new cellular telephone motorcycle mounting apparatus construction wherein the same can be utilized for mounting a cellular telephone to a motorcycle gas tank.

The general purpose of the present invention, which will be described subsequently in greater detail, is to provide a new cellular telephone motorcycle mounting apparatus apparatus and method which has many of the advantages of the cases for cellular telephones mentioned heretofore and many novel features that result in a new cellular telephone motorcycle mounting apparatus which is not anticipated, rendered obvious, suggested, or even implied by any of the prior art cases for cellular telephones, either alone or in any combination thereof.

To attain this, the present invention generally comprises a front portion, a back portion, a pair of lateral portion, a top portion and a bottom portion forming a rectangular enclosure, the rectangular enclosure being designed for receiving a cellular phone, the bottom portion having a transverse slit separating a bottom portion top section and a bottom portion bottom section, and the lateral portions having opposing slits extending along a length thereof, the opposing slits being aligned and joined with the transverse slit, the opposing slits and transverse slit defining an opening in the rectangular enclosure, a pair of opposing handle portions, each handle portion being disposed along a back portion longitudinal edge, an aperture formed in the top portion, the aperture being designed for receiving a cellular phone antenna, a plurality of magnets fixedly attached to a back portion outside surface for attachment to a motorcycle gas tank and a means for releasably closing the opening in the rectangular enclosure.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new cellular telephone motorcycle mounting apparatus apparatus and method which has many of the advantages of the cases for cellular telephones mentioned heretofore and many novel features that result in a new cellular telephone motorcycle mounting apparatus which is not anticipated, rendered obvious, suggested, or even implied by any of the prior art cases for cellular telephones, either alone or in any combination thereof.

It is another object of the present invention to provide a new cellular telephone motorcycle mounting apparatus which may be easily and efficiently manufactured and marketed.

It is a further object of the present invention to provide a new cellular telephone motorcycle mounting apparatus which is of a durable and reliable construction.

An even further object of the present invention is to provide a new cellular telephone motorcycle mounting apparatus which is susceptible of a low cost of manufacture with regard to both materials and labor, and which accordingly is then susceptible of low prices of sale to the consuming public, thereby making such cellular telephone motorcycle mounting apparatus economically available to the buying public.

Still yet another object of the present invention is to provide a new cellular telephone motorcycle mounting apparatus which provides in the apparatuses and methods of the prior art some of the advantages thereof, while simultaneously overcoming some of the disadvantages normally associated therewith.

Still another object of the present invention is to provide a new cellular telephone motorcycle mounting apparatus for mounting a cellular telephone to a motorcycle gas tank.

Still yet another object of the present invention is to provide a new cellular telephone motorcycle mounting apparatus that prevents loss and damage to a cellular phone.

Even still another object of the present invention is to provide a new cellular telephone motorcycle mounting apparatus that is easily mountable and removable from a motorcycle gas tank.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is a rear elevation view of the invention.

FIG. 5 is an isometric view of the present invention.

DESCRIPTION OF THE PREFERRED EMBODIMENT

Figure 1:
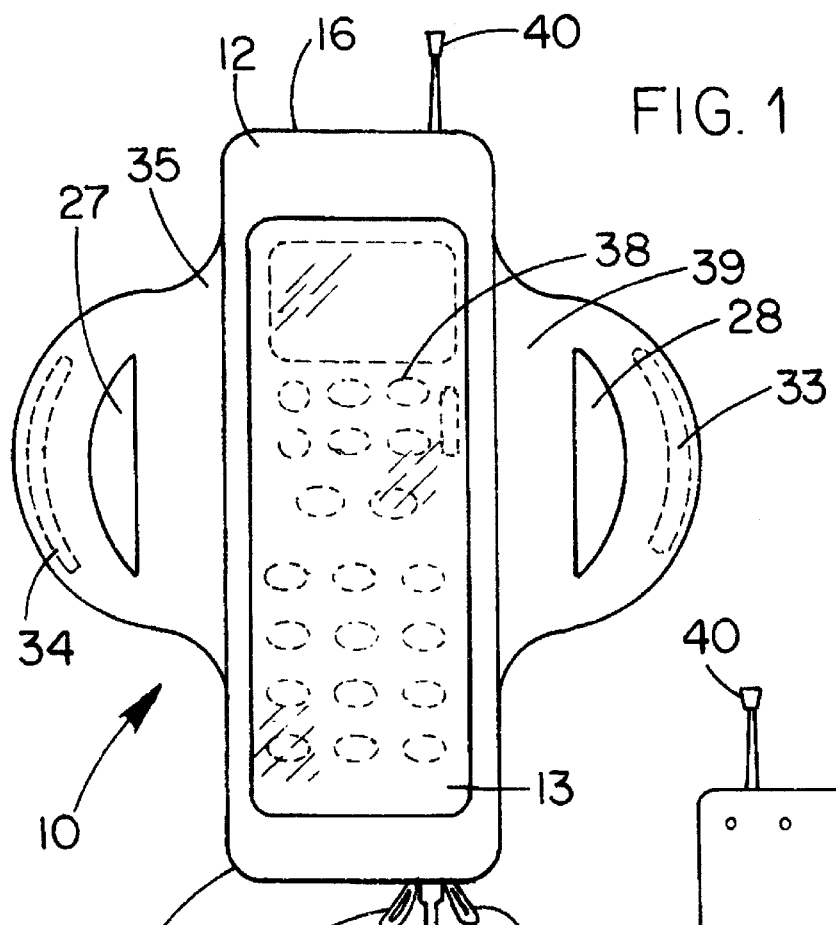
FIG. 1 is a plan view of a new cellular telephone motorcycle mounting apparatus according to the present invention.

With reference now to the drawings, and in particular to FIGS. 1 through 5 thereof, a new cellular telephone motorcycle mounting apparatus embodying the principles and concepts of the present invention and generally designated by the reference numeral 10 will be described.

More specifically, it will be noted that the cellular telephone motorcycle mounting apparatus 10 comprises a front portion 12, a back portion 14, a pair of lateral portions 41 and 42, a top portion 44 and a bottom portion 43 forming a rectangular enclosure. The rectangular enclosure is preferably formed of a waterproof material such as nylon and is dimensioned to receive a cellular phone.

With reference to FIG. 1 the front portion 12 is shown including a front portion upper edge 16 and a front portion lower edge 15. Disposed intermediate the upper edge 16 and the lower edge 15 is shown a transparent portion 13 which is bonded to the nylon material in a conventional manner. The transparent portion 13 allows for the viewing and access of the key pad and LCD display of the cellular phone 38. Also shown are handle portion upper sides 35 and 39.

Figure 3:
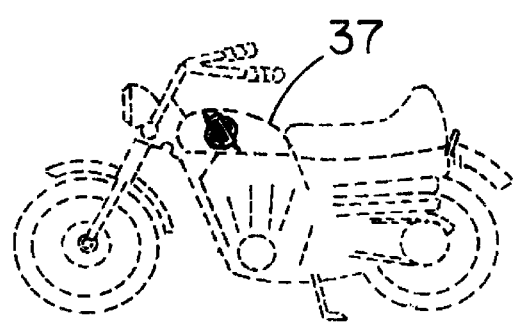
FIG. 3 is a perspective view showing the new cellular telephone motorcycle mounting apparatus in use.

With reference to FIG. 4 the back portion 14 is shown including a back portion upper edge 18 and a back portion lower edge 17. Fixedly attached to a back portion outside surface 19 are shown a plurality of magnets 20, 21 and 22. The magnets 20, 21 and 22 are designed and spaced to secure the back portion 14 to a motorcycle gas tank 37 (FIG. 3).

With continued reference to FIG. 4 a pair of generally semicircular handle portions 29 are shown disposed along back portion longitudinal edges 31 and 32. Each handle portion 29 is shown including a generally semi-circular aperture 27 and 28. In use the handle portions 29 can be secured together by means of a hook and loop system such as Velcro®, shown as 33 and 34. With the semi-circular apertures 27 and 28 aligned and secured, the cellular telephone motorcycle mounting apparatus 10 serves as a carrying case wherein a person's hand is received within the semi-circular apertures 27 and 28. Additionally, a belt 36 may be woven through the apertures 27 and 28 and the cellular telephone motorcycle mounting apparatus 10 used as a belt carrying case for the cellular phone 38. Also shown in FIG. 4 are a pair of magnets 23 and 24 fixedly attached to handle portion undersides 25 and 26. Magnets 23 and 24 provide additional means for securing the cellular telephone motorcycle mounting apparatus 10 to the motorcycle gas tank 37.

With reference to FIG. 5 the bottom portion 43 is shown having a transverse slit separating a bottom portion top section 46 and a bottom portion bottom section 45. Opposing slits are shown formed in each lateral portion 41 and 42. The opposing slits are formed aligned and joined with the transverse slit to define an opening 11 in the rectangular opening. The opening 11 provides a means for inserting a cellular phone 38 into the rectangular opening.

Figure 2:
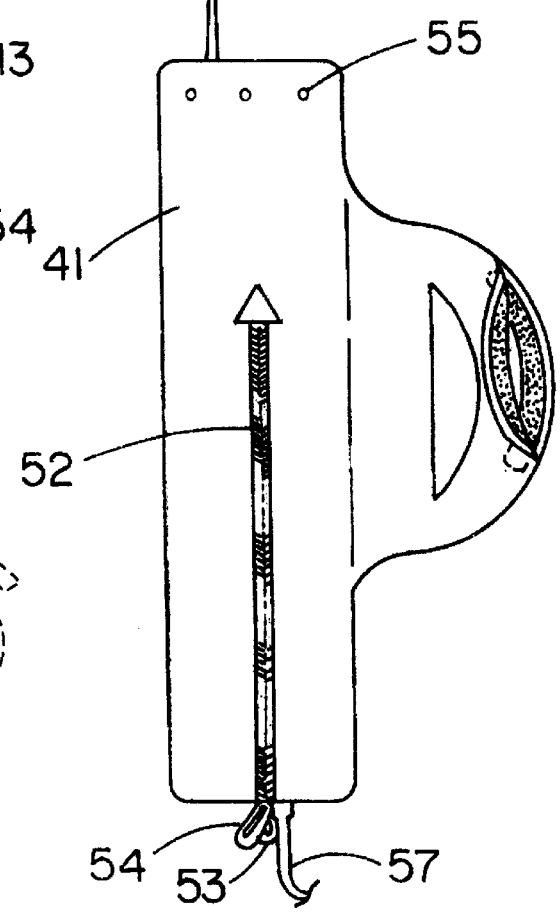
FIG. 2 is a side elevation view thereof.

With reference to FIGS. 2 and 5 a means for releasably closing the opening 11 and thereby protecting the inserted cellular phone 38 from loss and damage is shown including a first zipper means 51 for releasably closing one of the opposing slits and a first portion of the transverse slit. In similar fashion a second zipper means 52 is shown for releasably closing the other opposing slit and a second portion of the transverse slit. The first and second zipper means 51 and 52 are shown provided with zipper tabs 53 and 54.

With continued reference to FIG. 5 a first slot 50 is shown formed in a bottom portion bottom section edge 47. A second slot 49 is shown formed in a bottom portion top section edge 48. When the opening 11 is in it's closed position, the first and second slots 50 and 49 define a power cord aperture designed for receiving a cellular phone power cord 57.

An antenna aperture (not shown) is provided on the top portion 44 designed to receive an antenna 40 of the cellular phone 38. Also provided are air holes 55 for providing ventilation within the rectangular enclosure In use, the cellular phone 38 is inserted through the opening 11 into the rectangular enclosure. Zipper means 51 and 52 are closed to secure the cellular phone 38 within the rectangular enclosure. The magnets 20, 21, 22, 23 and 24 are secured to the motorcycle gas tank 37 and thereby secure the cellular telephone motorcycle mounting apparatus 10 to the motorcycle gas tank 37. When not in use on the motorcycle, the cellular telephone motorcycle mounting apparatus 10 can be used as either a carrying case or belt carrying case as previously described.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A cellular telephone motorcycle mounting apparatus for use with a motorcycle having a gas tank comprising:

a front portion, a back portion, a pair of lateral portions, a top portion and a bottom portion forming a rectangular enclosure, the rectangular enclosure being for receiving a cellular phone, the bottom portion having a transverse slit separating a bottom portion top section and a bottom portion bottom section, and the lateral portions having opposing slits extending along a length thereof, the opposing slits being aligned and joined with the transverse slit, the opposing slits and transverse slit defining an opening in the rectangular enclosure;

a pair of opposing handle portions, each handle portion being disposed along a back portion longitudinal edge;

an aperture formed in the top portion, the aperture being for receiving a cellular phone antenna;

a plurality of magnets fixedly attached upon a back portion outside surface; and a means for releasably closing the opening in the rectangular enclosure.

2. The cellular telephone motorcycle mounting apparatus of claim 1, wherein the means for releasably closing the opening in the rectangular enclosure further comprise a first zipper means for releasably closing one of the opposing slits and a first portion of the transverse slit and a second zipper means for releasably closing the other opposing slit and a second portion of the transverse slit.

3. The cellular telephone motorcycle mounting apparatus of claim 1, wherein the bottom portion further comprises a first slot formed in a bottom portion edge and a second slot formed in a top portion edge, the first slot and second slot defining an aperture when the opening is in it's closed position, the aperture being for receiving a cellular phone power cord.

4. The cellular telephone motorcycle mounting apparatus of claim 1, wherein the front portion further comprises a transparent portion formed therein.

5. The cellular telephone motorcycle mounting apparatus of claim 1, wherein each handle portion further comprises an aperture formed therein, the apertures being alignable.

6. The cellular telephone motorcycle mounting apparatus of claim 5, wherein the handle portions further comprise a means for releasably attaching the handle portions to one another.

7. The cellular telephone motorcycle mounting apparatus of claim 1, wherein each handle portion further comprises a magnet fixedly attached to a handle portion under side.

* * * * *